United States Patent [19]

Ludwig

[11] 4,079,750
[45] Mar. 21, 1978

[54] VACUUM DELAY VALVE

[75] Inventor: George Ludwig, Troy, Mich.

[73] Assignee: Tom McGuane Industries, Inc., Farmington, Mich.

[21] Appl. No.: 663,846

[22] Filed: Mar. 4, 1976

[51] Int. Cl.² .................. F16K 15/14; F16K 47/12
[52] U.S. Cl. .................. 137/513.7; 137/599.2; 251/126; 138/42; 138/43
[58] Field of Search ............... 138/42, 43; 137/513.3, 137/513.7, 513.5, 854, 599.2, 600; 251/126

[56] References Cited

U.S. PATENT DOCUMENTS

| | | | |
|---|---|---|---|
| 2,804,093 | 8/1957 | Scherer | 138/43 X |
| 2,992,659 | 7/1961 | Thomas | 138/42 |
| 3,095,006 | 1/1963 | Smith | 251/126 |
| 3,403,696 | 10/1968 | Pynchon | 137/854 X |
| 3,693,657 | 9/1972 | Olson | 251/126 X |

FOREIGN PATENT DOCUMENTS 288,071 12/1913 Germany .................. 251/126

Primary Examiner—William R. Cline
Attorney, Agent, or Firm—Barnes, Kisselle, Raisch & Choate

[57] ABSTRACT

A delay valve comprising a housing including a side wall and opposed end walls and a plug in the housing cooperating with the side wall to define a first and second chamber. A check valve is provided in the plug permitting flow of air in one direction such that air may flow freely from the second through said check valve to the first chamber and is prevented from flowing from the first to the second chamber. The end walls of the housing have openings communicating with the exterior of the housing, and the plug has a peripheral portion that cooperates with the side wall of the housing to define a helical passage communicating with said first and second chambers.

24 Claims, 13 Drawing Figures

VACUUM DELAY VALVE

This invention relates to spark delay valves.

BACKGROUND OF THE INVENTION

It has become common on some automotive engines, to use a delay valve to control various functions. For example, a delay valve may be used as a spark delay valve in the control of exhaust emissions. The spark delay valve functions to delay the vacuum spark advance during light acceleration.

Among the objects of the invention are to provide a spark delay valve which will function to provide a desired prolonged time delay; which can be readily designed to provide different time delays; which can be readily manufactured and assembled; and which will provide an accurate predetermined time delay.

SUMMARY OF THE INVENTION

In accordance with the invention, the delay valve comprises a housing including a side wall and opposed end walls, and a plug in the housing cooperating with the side wall to define a first and second chamber. The end walls of the housing have openings communicating with the exterior of the housing. One of the plugs and housing has a peripheral surface that cooperates with the peripheral surface of the other of the plug and housing to define a restricted circuitous passage communicating with the first and second chambers. When used as a spark delay valve, a check valve is provided in the plug permitting flow of air in one direction and preventing flow of air in the opposite direction such that air may flow freely from the second to the first chamber and is prevented from flowing through said check valve from the first to the second chamber.

DESCRIPTION

Figure 1:
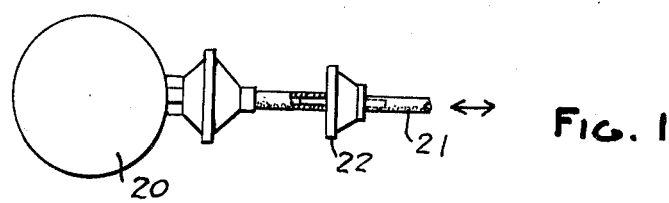
FIG. 1 is a partly diagrammatic view of a portion of an engine system incorporating the invention.
Figure 2:
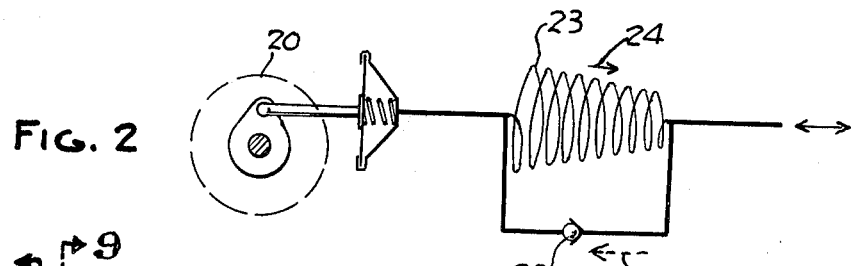
FIG. 2 is a diagrammatic view of the manner in which the system functions.

Referring to FIG. 1, the invention is particularly adapted for use in connection with a spark delay valve system which incorporates a distributor 20 that is normally connected to a vacuum line 21 to vary the advance of the spark provided by the distributor in accordance with the vacuum produced by the engine as it operates. The spark delay valve 22 is interposed between the distributor 20 and the vacuum line 21 and functions to provide a restricted helical flow through structure which defines a helical path 23 in the direction of the arrow 24 and to provide a free flow in the direction of the arrow 26 through a check valve 26. (FIG. 2)

Thus the valve 22 permits immediate spark retardation on deceleration of the engine and provides for delayed vacuum spark advance during periods of acceleration.

Figure 3:
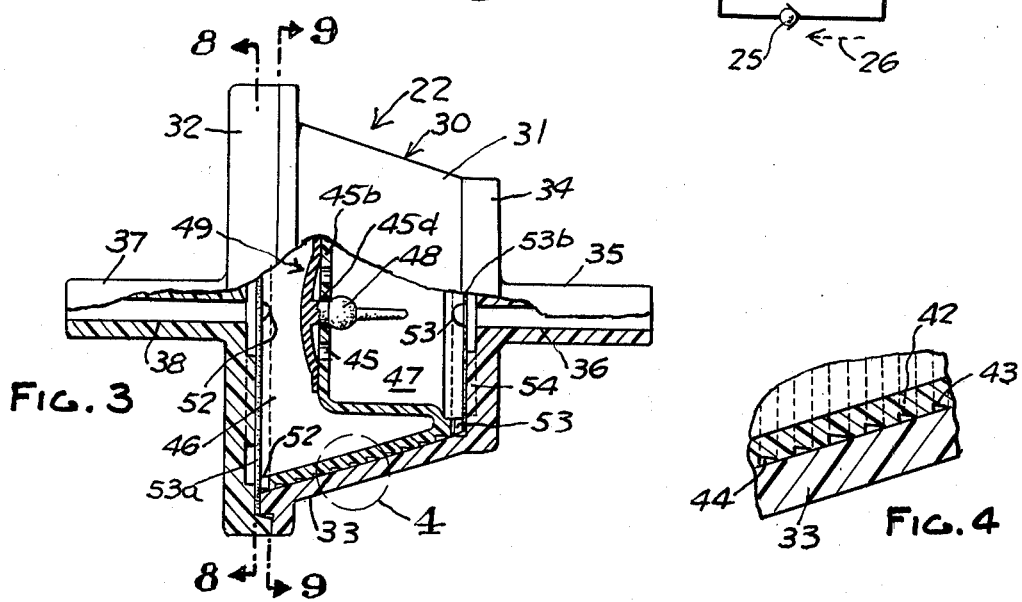
FIG. 3 is a part sectional view of a spark delay valve embodying the invention.

Referring to FIG. 3, the spark delay valve 22 includes a housing 30 made of plastic such as glass reinforced nylon manufactured by Dupont under the trademark ZYTEL and comprises a first part 31 and a second part 32. The first part 31 includes a frusto-conical side wall 33 with an integral end wall 34 and an axially extending tube 35 defining a passage 36. The part 32 comprises a cover which is generally planar and includes a tube 37 defining an axial passage 38.

Figure 7:
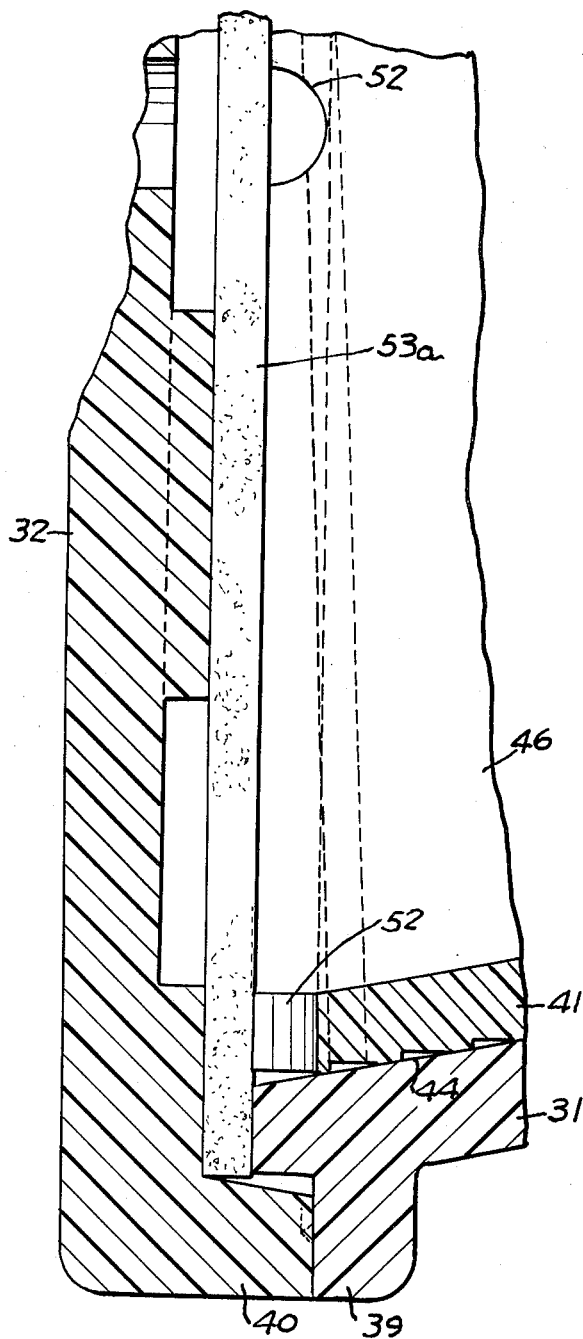
FIG. 7 is a fragmentary sectional view on an enlarged scale of a portion of the valve shown in FIG. 3.

As shown in FIG. 7, the part 31 includes a radial flange 39 which is engaged by an axial flange 40 on the cover 32. The flanges 39, 40 are connected to one another as by ultrasonic welding to provide a sealed housing.

Figure 4:
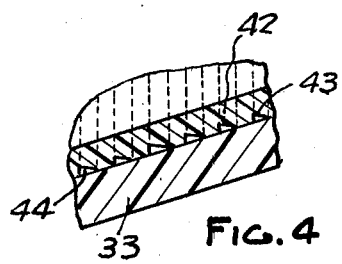
FIG. 4 is a fragmentary sectional view on an enlarged scale of the portion marked 4 in FIG. 3.

A plug 41 made of plastic or a flexible elastomer such as is Dupont Hytrel provided within the housing 30 and includes a frusto-conical wall or portion 42 having substantially the same configuration as the inner surface of the wall 33. The outer surface of portion 42 is formed with a helical groove 43 having angularly related surfaces. The outer surface cooperates with the inner surface of the wall 33 to define a restricted helical passage 44. (FIGS. 3, 4 and 7) Alternatively, the helical passage can be formed on the inner surface of wall 33. Further the passage may be labrynth type such as numerous 90 degree bends to offer increased resistance to fluid flow.

The plug 41 further includes a transverse wall 45 that includes a cylindrical wall portion 45a and a transverse wall portion 45b so that it defines a first chamber 46 and a second chamber 47. (FIGS. 3, 6, 10) The helical path 44 provides a restricted flow between the chambers 46, 47. Transverse wall 45 includes spaced openings 45c and a central opening 45d through which the projection 48 of a mushroom one-way or check valve 49 of resilient material extends. The mushroom check valve 49 includes a flexible laterally extending portion 50 that normally covers the opening 46 and prevents flow from the first chamber 46 to the second chamber 47 but permits flow from the second chamber 47 through the opening 46 to the first chamber.

Figure 5:
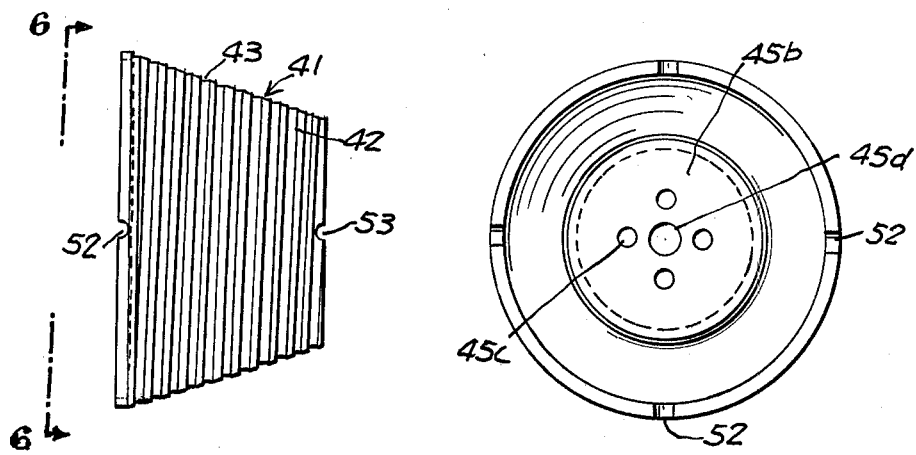
FIG. 5 is a side elevational view of a portion of the valve.
Figure 6:
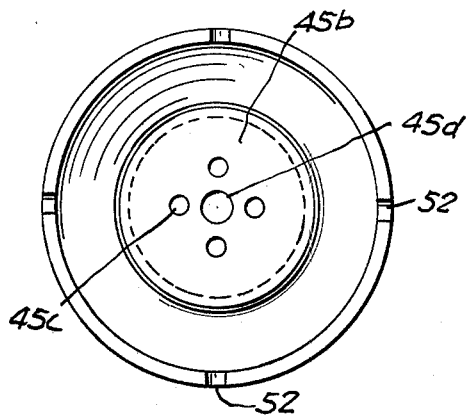
FIG. 6 is an end view of the same taken along the line 6—6 in FIG. 5.

As shown in FIGS. 5 and 6, the ends of the frusto-conical portion 42 of plug 41 are formed with circumferentially spaced radial grooves 52, 53 that communicate with the helical passage 44 defining a plenum in association with the end walls and thereby providing communication between the chambers 46 and 47.

Figure 8:
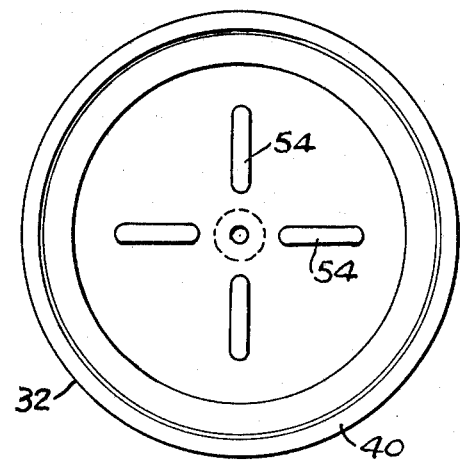
FIG. 8 is a view substantially taken along the line 8—8 in FIG. 3.
Figure 9:
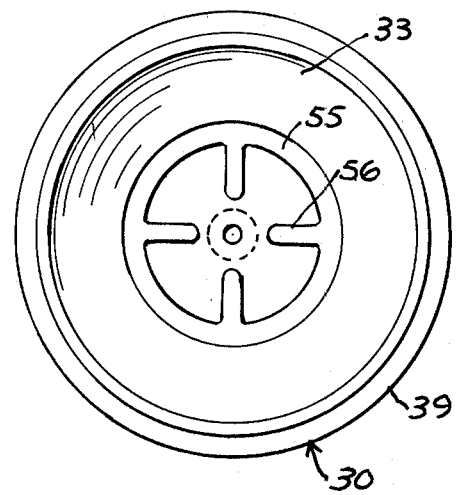
FIG. 9 is a view taken substantially along the line 9—9 in FIG. 3, parts being broken away.

Filters 53a, 53b are provided at the ends of the frusto-conical portions to filter the passage of air. The filters are kept out of contact with the end walls and particularly the axial openings 38, 36 by appropriate means such as integral ribs 54 on end wall 32 and integral ring 55 and radially inwardly extending ribs 56 on end wall 34. (FIGS. 8, 9)

The diameters of the walls 33, 42 and the thickness of the wall 42 are so selected as to provide for an interference fit with flexing of the wall 42 to provide a close conformity with the inner surface of the wall 33. Alternatively, the diameters and thickness can be selected so that the wall 33 flexes to conform to the wall 42.

Figure 10:
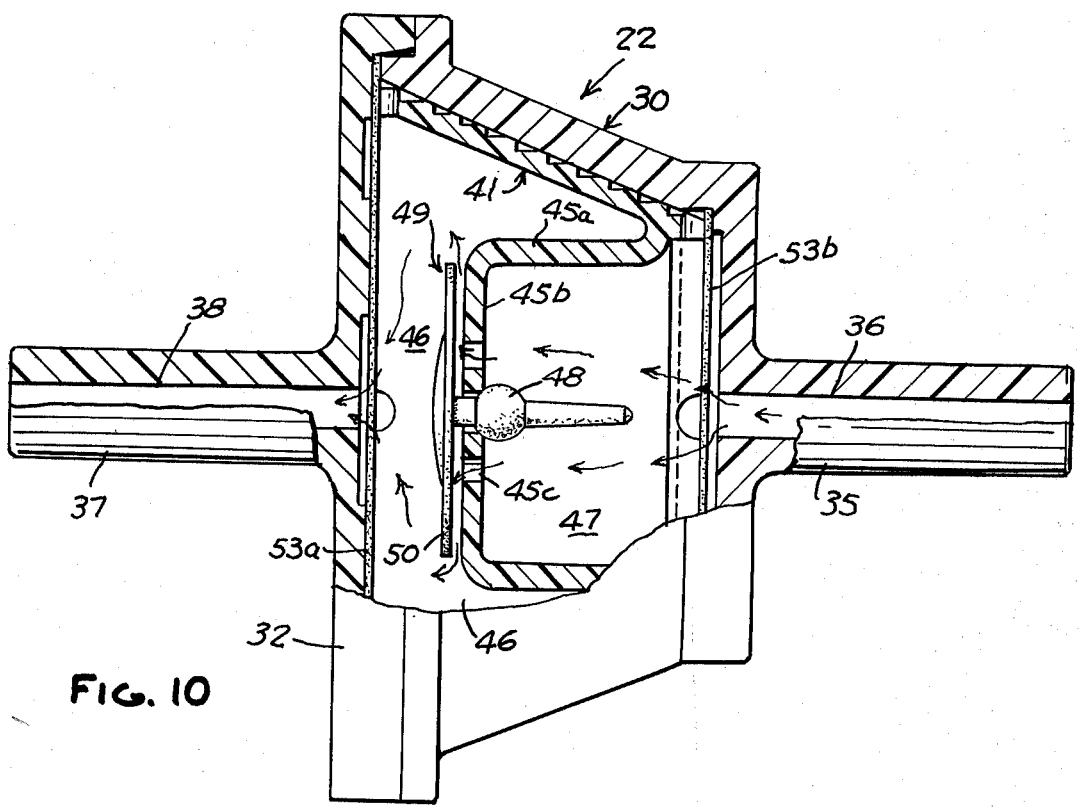
FIGS. 10 and 11 are sectional views showing diagrammatically the flow of air during operation of the spark delay valve.
Figure 11:
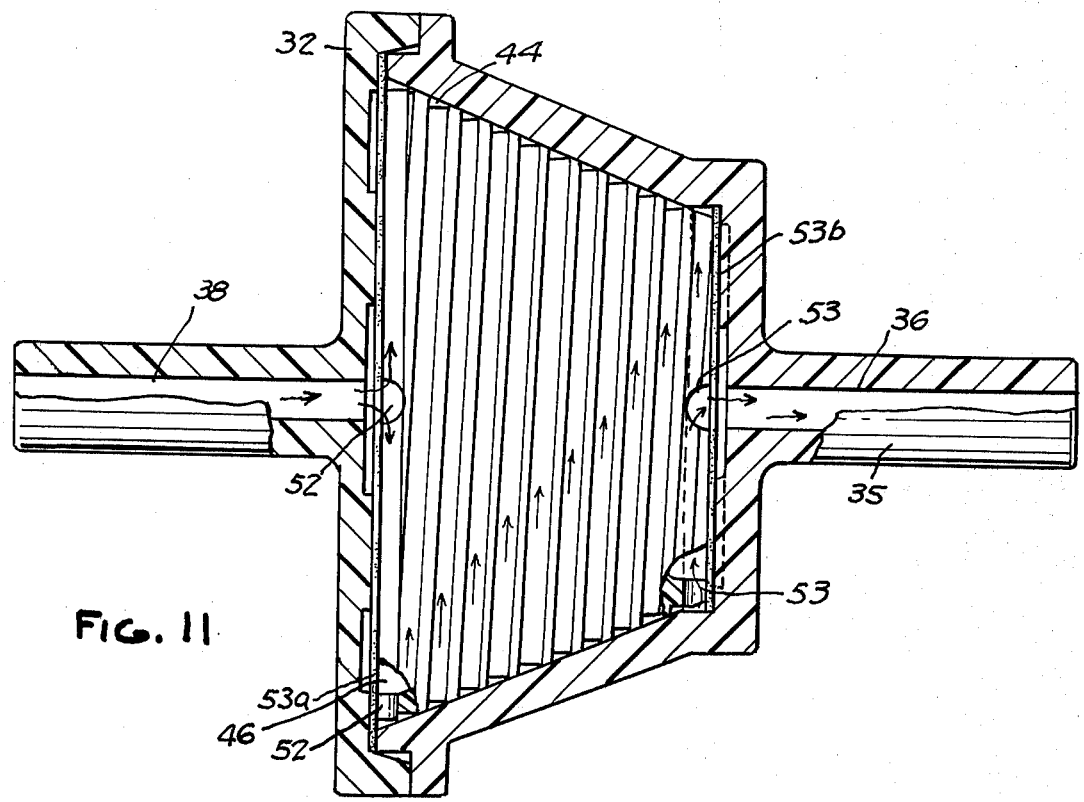

The manner in which the valve will function may be understood by reference to FIGS. 10 and 11.

The spark delay valve operates in such a manner that as differential pressures are applied to the valve through cylindrical passages 38, 36, the valve will provide free air flow or timed delay air flow between the ends 38 and 36 to reduce the pressure differential.

As shown in FIG. 10, if vacuum is applied to passage 38, air flow will occur freely from passage 36, through filter 53b, into chamber 47 then through holes 45c, the pressure differential lifting the outer diameter 50 of valve 49, allowing further air flow to chamber 46, then through filter 53a, and passage 38.

As shown in FIG. 11, if vacuum is applied to passage 36, air flow will occur from passage 38, through filter 53a, into cavity 46, through grooves 52, through helical passage 44, through grooves 53, into chamber 47, then through filter 53b and passage 36. During this flow the diameters of valve 49, 50 are held against wall portion 45 by forces of differential pressure thereby blocking air flow from chamber 46 to chamber 47. The air flow path is restricted by virtue of the small cross section and long length of groove 44 through which the air flow must pass. The value of restricted air flow may be varied as desired by changing the size and pitch of groove 44.

Figure 12:
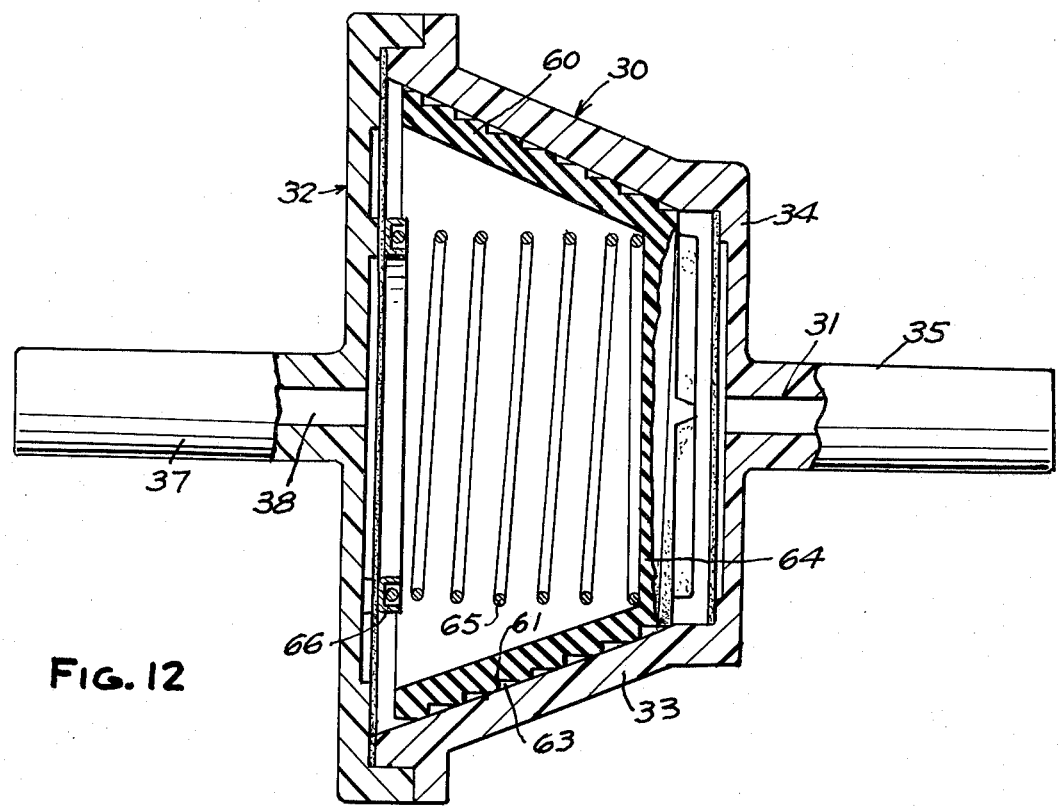
FIG. 12 is a part sectional longitudinal view of a modified form of valve.
Figure 13:
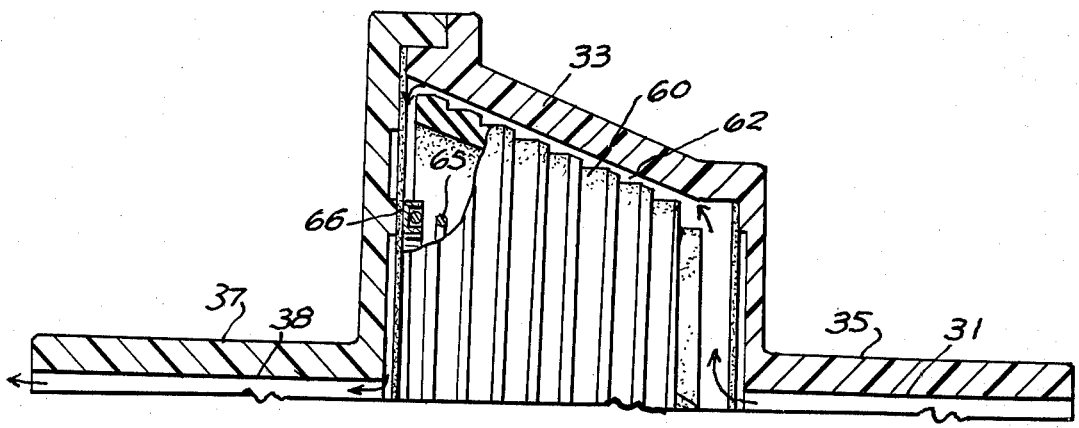
FIG. 13 is a view similar to FIG. 12 showing the parts in a different operative position.

In the form of the invention shown in FIGS. 12 and 13, a modified delay valve is shown which omits the one-way valve 49 and associated openings are eliminated and the plug is made of flexible elastomer.

Specifically, housing 30 is substantially identical as the housing 30 shown in the form of the invention shown in FIGS. 1–11. However plug 60 is made of flexible elastomer such as nylon made by Dupont under the trademark HYTREL. Plug 60 includes a frusto-conical wall 61 formed with a helical groove 62 and having substantially the same external configuration as the inner surface of wall 33 of housing 30. The outer surface of plug 61 cooperates with the inner surface of wall 33 to define a restricted helical passage 63.

Plug 60 includes an imperforate end wall 64 and a compression spring 65 is interposed between the cover 32 and the wall 64. This yieldingly urges the outer wall 61 of plug 60 against the inner surface of wall 33 thereby insuring that a helical restricted path is formed.

An annular retainer 66 can be interposed between cover 32 and spring 65. Filters may or may not be provided on the ends of plug 60.

As shown in FIG. 12, if vacuum is applied to passage 36, air is drawn through passage 38, helical groove 63 and into passage 36. On the other hand if vacuum is applied to passage 38, the flow of air from passage 36 may be sufficient to lift plug 60 away from wall 33 to permit air to flow freely to passage 38.

It should be understood that if plug 41 in FIGS. 1–11 is made of flexible elastomer, then a spring such as spring 65 may be interposed between the cover 32 and the end of plug 41 to urge the wall 42 of plug 41 against wall 33.

It can thus be seen that there has been provided a valve that utilizes cooperating frusto-conical surfaces, one of which has a circuitous groove such as a helical or labrynth type groove which cooperates with the other surface to provide a restricted circuitous passage.

I claim:

1. In a spark delay valve, the combination comprising a housing,
said housing including a side wall and opposed end walls,
a plastic plug in said housing cooperating with said side wall to define a first and second chamber,
said end walls having openings communicating with the exterior of said housing,
said inner surface of said side wall of said housing and said cooperating peripheral portion of said plug having a frusto-conical configuration,
said inner surface of said side wall of said housing being smooth and said peripheral portion of said plug being formed with a helical groove having angularly related surfaces therein that cooperates with the inner surface of the wall of the housing to define a restricted passage, said angularly related surfaces being a first surface extending substantially parallel to the axis of said plug and a joining surface extending at an angle to the axis of said plug as viewed in cross-section.

2. The combination set forth in claim 1 wherein the thickness of said cooperating portion of one of said plug and said housing is such that said cooperating portion will deflect and conform to said inner surface of the other of said plug and said housing.

3. The combination set forth in claim 2 including a spring yieldingly urging said plug into said housing.

4. The combination set forth in claim 1 including a check valve in said plug permitting flow of air in one direction and preventing flow of air in the opposite direction such that air may flow freely from said second to said first chamber and is prevented from flowing from said first to said second chamber.

5. The combination set forth in claim 4 wherein said plug includes a central cylindrical portion and a transverse wall portion closing said central cylindrical portion, said check valve being positioned in said transverse wall portion.

6. The combination set forth in claim 5 wherein said transverse wall has at least one opening therein,
said check valve including a resilient member operable to prevent flow of air between said first and second chamber through said opening and to permit flow of air from said second chamber to said first chamber through said opening.

7. The combination set forth in claim 1 including a filter interposed between the plug and an end wall of said housing.

8. The combination set forth in claim 1 including a filter interposed between each said end wall and said plug.

9. The combination set forth in claim 8 wherein each said end wall includes means holding said filter axially away from the opening in said end walls.

10. The combination set forth in claim 9 wherein each said last-mentioned means holds said filter axially away from each said end wall through substantially the entire portion of the surface thereof.

11. The combination set forth in claim 1, wherein said cooperating peripheral portion of said plug includes passages in the ends thereof defining a plenum communicating with the ends of said restricted passage.

12. The combination set forth in claim 1 wherein the frusto-conical portion of one of said housing and said plug is flexible relative to the other of said housing and plug.

13. In a spark delay valve, the combination comprising
a housing,
said housing including a frusto-conical side wall and opposed end walls,
a plastic plug in said housing having a transverse wall cooperating with said side wall to define a first and second chamber,
said end walls having openings communicating with the exterior of said housing,
said plug having a frusto-conical peripheral portion cooperating with said frusto-conical wall of said housing,
said inner surface of said frusto-conical side wall of said housing being smooth and said outer surface of said frusto-conical portion of said plug having a similar configuration being formed with a helical groove having angularly related surfaces therein that cooperates with the inner surface of the frusto-conical side wall of the housing to define a helical passage, said angularly related surfaces being a first surface extending substantially parallel to the axis of said plug and a joining surface extending at an angle to the axis of said plug as viewed in cross-section.

14. The combination set forth in claim 13 including a spring yieldingly urging said plug into said housing.

15. The combination set forth in claim 13 wherein the thickness of said frusto-conical portion is one of said plug and said housing is such that said frusto-conical portion will deflect and conform to said frusto-conical portion of the other of said plug and said housing.

16. The combination set forth in claim 13 including a check valve in said plug permitting flow of air in one direction and preventing flow of air in the opposite direction such that air may flow freely from said second to said first chamber and is prevented from flowing from said first to said second chamber.

17. The combination set forth in claim 16 wherein the transverse wall of said plug includes a central cylindrical portion and a transverse wall portion closing said central cylindrical portion, said check valve being positioned in said transverse wall portion.

18. The combination set forth in claim 17 wherein said transverse wall has at least one opening therein,
said check valve including a resilient member operable to prevent flow of air between said first and second chamber through said opening and to permit flow of air from said second chamber to said first chamber through said opening.

19. The combination set forth in claim 13 including a filter interposed between the plug and an end wall of said housing.

20. The combination set forth in claim 13 including a filter interposed between each said end wall and said plug.

21. The combination set forth in claim 20 wherein said end walls include means holding said filters axially away from the opening in said end walls.

22. The combination set forth in claim 21 wherein said last-mentioned means holds said filters axially away from said end wall throughout substantially the entire portion of the surface thereof.

23. The combination set forth in claim 13 wherein said cooperating portion of said plug includes passages in the ends thereof defining a plenum communicating with the ends of said helical passage.

24. The combination set forth in claim 13 wherein the frusto-conical portion of one of said housing and said plug is flexible relative to the other of said housing and plug.

* * * * *